United States Patent [19]

Jacquet et al.

[11] Patent Number: 4,492,361
[45] Date of Patent: Jan. 8, 1985

[54] FLAP FOR AIR FLOW CONTROL IN VEHICLE HEATING AND COOLING SYSTEMS

[75] Inventors: Maurice Jacquet; Jean-Claude Le Du, both of Maurepas, France

[73] Assignee: Valeo, Paris, France

[21] Appl. No.: 399,285

[22] Filed: Jul. 19, 1982

[30] Foreign Application Priority Data

Jul. 28, 1981 [FR] France .................. 81 14631

[51] Int. Cl.³ .................................. F16K 1/22
[52] U.S. Cl. ........................... 251/356; 251/306
[58] Field of Search ........... 137/601; 251/305, 306, 251/356

[56] References Cited

U.S. PATENT DOCUMENTS

| 3,275,031 | 9/1966 | Alyea et al. | 137/601 |
| 3,495,521 | 2/1970 | Foster | 137/601 |
| 3,547,152 | 12/1970 | Hess | 137/601 |
| 3,572,632 | 3/1971 | Bengtsson | 251/306 |
| 3,635,245 | 6/1972 | Canfield | 137/607 |
| 3,749,115 | 7/1973 | Raftis | 251/306 |
| 3,885,347 | 5/1975 | Adachi et al. | 49/92 |

FOREIGN PATENT DOCUMENTS

| 1130544 | 2/1957 | France. | |
| 2364389 | 5/1978 | France | 137/601 |

*Primary Examiner*—A. Michael Chambers
*Attorney, Agent, or Firm*—Dennison, Meserole, Pollack & Scheiner

[57] ABSTRACT

A flap (11) for controlling the flow of air in a duct, in particular in a heater or air conditioner installation for the cabin of a motor vehicle, comprises an assembly of two half-flaps (12) applied against each other and each having projecting hollow stiffener ribs (13) disposed substantially opposite to one another, to constitute a hollow box structure. A sealing ring (17) is moulded over touching peripheral rims (16) of the half-flaps. For given stiffness, this structure may four or five times lighter than a conventional sheet metal flap, thereby reducing the force needed to actuate the flap.

5 Claims, 3 Drawing Figures

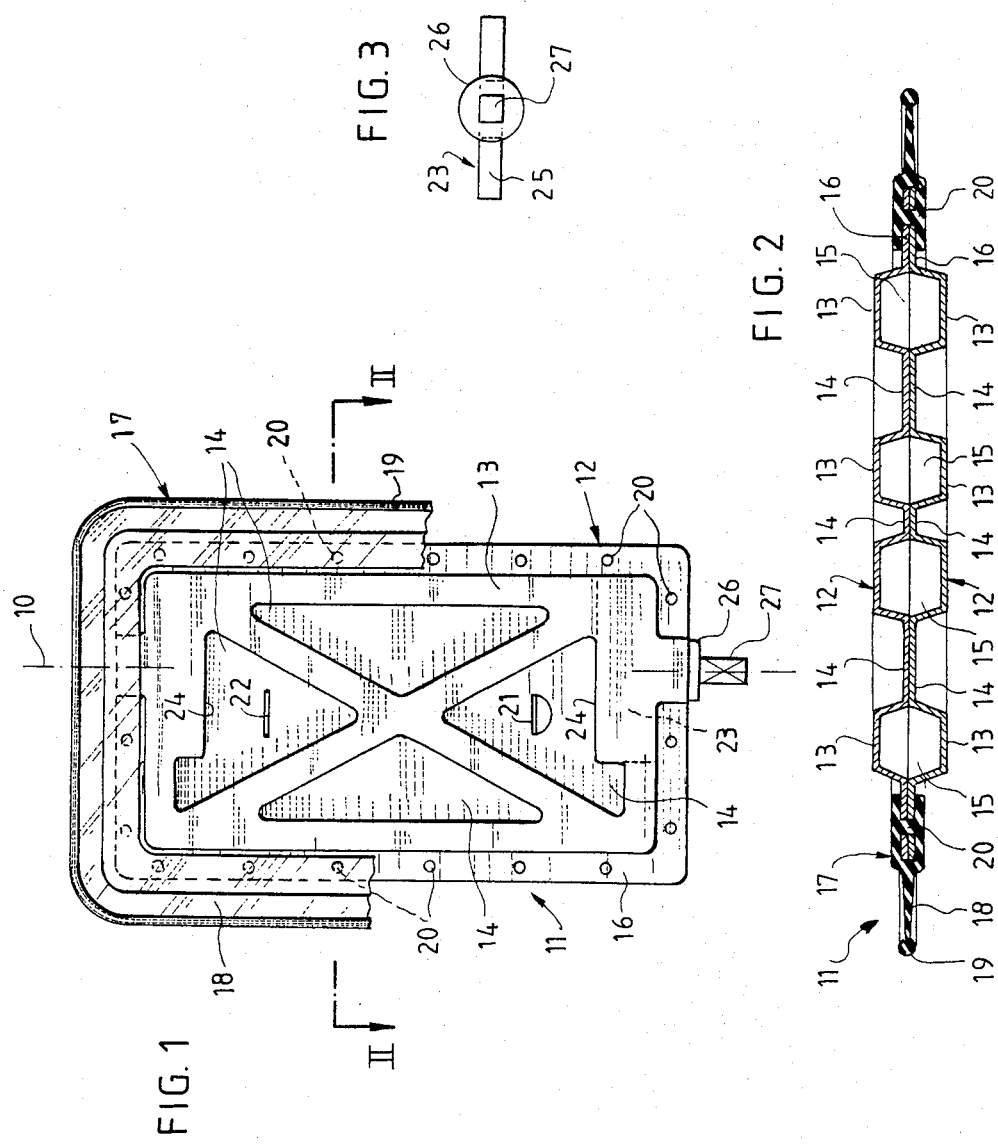

FLAP FOR AIR FLOW CONTROL IN VEHICLE HEATING AND COOLING SYSTEMS

The invention relates to a flap for controlling the flow of air through a duct, particularly in a heater or air conditioner installation for the cabin of a motor vehicle.

BACKGROUND OF THE INVENTION

It is known that such an installation includes ducts or conduits through which hot air and cold air passes and in which the flow of air is adjusted by flaps rotatably mounted in the ducts to vary the cross section of the air passage through the duct or conduit. These flaps are generally actuated from the vehicle dash board by means of control cables that slide in protective sheaths.

It is important for the flaps to be sufficiently rigid against bending and twisting to avoid being bent or twisted about their axis of rotation. Up to the present, they have therefore been made either of relatively thick (at least 1 mm thick) galvanised metal, or of rigid plastics material, generally including fibre reinforcement and provided with stiffening ribs.

In both cases the flaps are heavy and can only be rotated by applying a relatively large force to their control cables.

Further, flap rotation control must be substantially irreversible, ie. the flow of air through the corresponding duct must not change the position of the flaps. To ensure this, brake means between the cable and its sheath are provided to apply a sufficiently large resistance to movement to ensure that a flap cannot be moved solely by the action of the air flow in the duct. This braking force adds to the force needed to overcome the inertia due to the weight of the flap so that the flap controlling force needed from the vehicle dash board is large and the controls appear to be stiff.

Preferred embodiments o the present invention avoid this drawback, providing a control flap which is very light in weight but which is nonetheless sufficiently rigid.

SUMMARY OF THE INVENTION

The present invention provides a flap for controlling the flow of air in a duct, in particular in a heater or air conditioner installation for the cabin of a motor vehicle, wherein the flap is constituted by two half-flaps applied against each other with each having hollow stiffener ribs disposed facing one another so as to form a hollow ribbed box structure.

Half-flaps in accordance with the invention may be stamped and cut out from a thin sheet of light material, eg. aluminum.

It has been observed that the resulting flap is much more rigid, both in bending and in twisting, than a flap made from the same material but using a single sheet of twice the thickness.

It has also been observed that, for given stiffness, the invention can be used to reduce the weight of a flap by a factor of 4 or 5 times, thereby considerably reducing the force needed to actuate the flap.

BRIEF DESCRIPTION OF THE DRAWING

In the following description which is given by way of example, reference is made to the accompanying drawing, in which:

FIG. 1 is a partially cut away plan view of a flap in accordance with the invention;

FIG. 2 is a section on a larger scale along a line II—II in FIG. 1; and

FIG. 3 is an end view of a flap in accordance with the invention.

MORE DETAILED DESCRIPTION

The accompanying diagrammatic drawings show a flap in accordance with the invention and suitable for use as an air flow controlling flap in a heater or air conditioner installation for the cabin of a motor vehicle.

Normally, such a flap is generally rectangular in shape and is rotatably mounted about an axis 10 which is parallel to one of the sides of the flap, and which may be offset or out of center relative to the median axis of the flap.

A flap 11 in accordance with the invention is made by assembling two half-flaps 12 which are applied against each other and fixed rigidly to each other. The two half-flaps 12 are preferably identical, with each of them being constituted by a metal sheet, eg. of aluminum or a light alloy, which is stamped to form hollow projecting ribs 13 and plane portions 14. The two half-flaps are applied against each other in such a manner that their plane portions 14 are in contact with one another, while their ribs 13 are opposite one another thereby delimiting box section channels 15 in communication with one another, the entire assembly constituting a multi-compartment hollow box structure.

Each half-flap 12 has a plane peripheral rim or flange 16, which is preferably trapped in a resiliently deformable sealing ring 17 moulded thereover and made of rubber, for example. In the embodiment shown, the ring 17 has a resiliently deformable peripheral lip 18 terminated by beading 19. The sealing ring 17 enables the flap 11 to provide air-tight sealing of the duct in which it is rotatably mounted.

To facilitate moulding the sealing ring 17, the peripheral rims 16 of the half-flaps 12 may include aligned holes 20 suitable for being filled with sealing rng material during moulding.

The two half-flaps 12 may be held together solely by the sealing ring 17 moulded over their peripheral rims 16 in the manner described above. The two half-flaps can also be assembled by riveting through their peripheral rims 16 and/or some of their plane portions 14, or else by means of tabs 21 provided on some of the plane portions 14 and suitable for being received in slots 22 of the corresponding plane portions 14 of the other half-flap, and then being bent over in conventional manner. The tabs 21 and the slots 22 are advantageously formed by split portions.

In accordance with another characteristic of the invention, the flap's axis of rotation 10 is materialised by two end pieces 23 lodged in between the two half-flaps and held in place by the two half-flaps being assembled to each other. For this purpose each half-flap includes a projecting portion 24 delimiting a housing for a part 25 of the each end piece 23, the remainder of which is outside the flap 11 and comprises an annular flange 26 and a square section stub axle 27. In FIG. 1, the flap 11 in accordance with the invention has been shown provided with an end piece 23 on one side but not on the opposite side.

In a variant, not shown, the flap 11 may have two aligned empty housings, suitable for receiving drive stub axles projecting inwardly through the walls of the duct.

Each half-flap 12 is advantageously made by stamping and cutting out or splitting a sheet of aluminum whose thickness lies between about 0.3 and 0.5 mm. The flap 11 constituted by assembling two such half-flaps has much higher bending and twisting strength than a flap made from a single sheet of aluminum that is about 1 mm thick. As indicated above, a flap 11 in accordance with the invention, such as the flap shown in the drawing, has the same bending and twisting strength about the axis 10 as a prior art flap weighing between four to five times as much.

The force required from the drive cable for a flap in accordance with the invention is substantially independent of the weight of the flap, and need only overcome the braking force applied to the cable. This provides a control which is not stiff.

We claim:

1. A flap for controlling the flow of air in a duct, and particularly in a heater or air conditioner for a motor vehicle, said flap having a peripheral edge being formed by two substantially identical, half-flaps stamped from a sheet of light material having a thickness of less than about 0.6 mm, the half-flaps being joined together in face-to-face relation, each of said half-flaps having a plurality of outwardly projecting hollow stiffener ribs disposed opposite from each other and having rib interiors facing each other when the two are joined forming box section channels, the ribs in each half-flap including longitudinal, transverse, and diagonal rib portions all being in contiguous relation with each other, a duct sealing ring of resiliently deformable material, molded over the peripheral edge of the flap, and an end piece fixed between the mating half-flaps on at least one end of the flap when joined and serving as a stub-axle about which the flap may pivot.

2. A flap according to claim 1 and further including at least one tab and one tab-receiving slot on each half-flap, each tab being received in the slot on the other half-flap and serving to secure the half-flaps together by being folded over the edge of the companion slot.

3. A flap according to claim 1, wherein each half-flap includes a substantially plane peripheral rim applied against a corresponding plane peripheral rim of the other half-flap.

4. A flap according to claim 3, wherein the said rims are provided with holes therethrough filled with material of which the sealing ring is made.

5. A flap according to claim 3, wherein the two half-flaps are held applied against each other by the sealing ring molded over their peripheral rims.

* * * * *